July 6, 1954   B. W. CAMPBELL   2,683,016
MOUNTING
Filed Dec. 26, 1951

INVENTOR.
Bruce W Campbell
BY
Ralph Hammar
Attorney

Patented July 6, 1954

2,683,016

UNITED STATES PATENT OFFICE 2,683,016

MOUNTING

Bruce W. Campbell, Erie, Pa., assignor to Lord Manufacturing Company, Erie, Pa., a corporation of Pennsylvania Application December 26, 1951, Serial No. 263,159

3 Claims. (Cl. 248—358)

In metal spring mountings where the internal damping is very low, it is necessary that some added friction damping be supplied. This invention is intended to provide such damping by a compact construction which will fit within the space required for the mounting.

Figure 1:
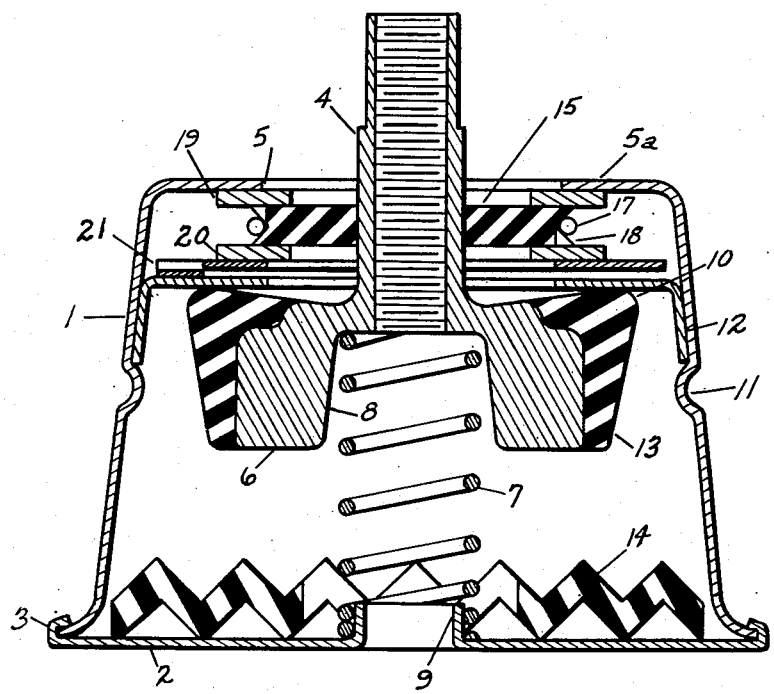
Figure 3:
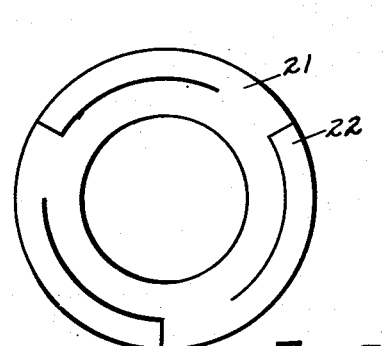
Figure 2:
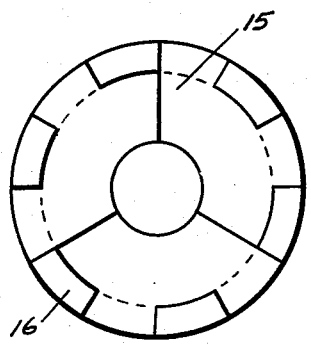
Figure 4:
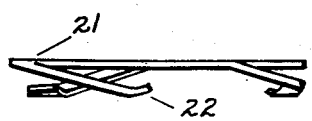

In the accompanying drawing, Fig. 1 is a sectional side elevation of a mounting; Fig. 2 is a top plan view of the segmental ring damper controlling the friction damping in a vertical direction; Fig. 3 is a top plan view of the spring washer controlling the friction damping in a horizontal direction; and Fig. 4 is an edge view of the washer in its unstressed position.

Referring to the drawing, the supporting and supported members comprise an inverted cup-shaped housing 1 having a bottom plate 2 crimped over the depending rim 3 and a stem 4 extending out through a clearance opening 5 to the top wall 5a of the cup and having an integral head 6 within the housing and spaced above the bottom plate 2. The load between the supporting and supported members is carried by a coil spring 7 arranged between a seat 8 on the under side of the head 6 and a seat 9 on the upper side of the bottom plate 2. Under no load conditions, the spring 7 holds the head 6 against a partition 10 spaced below the bottom wall of the cup 1. The partition 10 is conveniently held in the cup by shoulders 11 struck inwardly below depending flanges 12 on the partition, after the partition is slipped in place. To prevent metal-to-metal contact, an elastomer 13 is molded on the rim of the head 6. This elastomer rim 13 merely serves as a bumper. Under load, the head occupies a position intermediate the partition 10 and the bottom wall 2. Under shock loads, the head bottoms on a corrugated elastomer washer 14 which takes up the shock impact. The parts so far described comprise a resilient vibration isolating mounting which will decrease the transmission of vibrations between the supporting and supported members and which will cushion or reduce the impact of shock loads.

Because the coil spring 7 has very little internal damping, it is desirable that a friction damper be connected between the supporting and supported members so as to limit the excursion at resonance. Such a friction damper is provided between the upper side of the partition 10 and the top wall 5a of the inverted cup-shaped housing 1. The friction damper comprises a segmental ring washer 15 of suitable friction material. The washer 15 has segments 16 which are urged against the stem 4 by a split ring 17 in a peripheral groove 18. The contractile force of the split ring, which controls the friction force exerted on the stem, may be varied by changing the size of the wire and the unstressed diameter of the ring. The washer 15 is effective only for vertical damping or damping lengthwise of the stem 4. Horizontal damping or damping crosswise of the stem is controlled by washers 19 and 20 on the upper and lower surfaces of the segmental washer 15. A spring washer 21 on the upper surface of the partition 10 has circumferential fingers 22 which urge the friction washers 15, 19, and 20 up against the wall 5a. The friction damping force exerted on the washer 15 as the stem 4 moves horizontally or crosswise is determined by the spring fingers 22. Since the fingers extend circumferentially, the length is sufficient to make the friction damping force essentially constant.

Both the horizontal and vertical damping forces are independent of each other and of the load carried by the spring 7. This means that a damper for use with any mounting can be made by using only the part of the mounting above the partition 10. Such dampers are useful, because in some cases the most suitable points for applying friction damping are different from the points at which the resilient mountings are located.

The mounting and damper are easily assembled. With the cup-shaped housing 1 turned so the wall 5a is at the bottom, the washers 19, 15, 20, 21 are dropped in place in that order, the washer 15 having a split ring 17 in place. Next, the partition 10 is pushed toward the wall 5a with the force desired for horizontal damping and there located by crimping the shoulders 11. The stem 4 is then pushed through the washers and the assembly completed by seating the spring 7 in the seats 8 and 9 with the corrugated washer 14 telescoped over the spring and crimping the rim 3 over the edge of the plate 2.

What is claimed as new is:

1. In a resilient mounting, supporting and supported members, said supporting member comprising a housing including vertical wall portions and said supported member including a vertical stem projecting out of the housing and having a head within the housing, opposed seats on the head and on the housing, a coil spring between the seats, a cushion of an elastomer between the vertical walls of the housing and head, spaced walls on the housing positioned above said head and normal to the stem, and having clearance openings therein through which the stem extends, a segmental ring damper between the spaced walls and slidably surrounding the stem, said damper being slidable between said walls in a direction crosswise of the stem, a contractile spring surrounding the segmental ring damper and urging it into contact with the stem to exert a friction damping force resisting lengthwise movement of the stem, and a washer between the walls having integral spring fingers urging the damper toward one of the walls to exert a friction damping force resisting crosswise movement of the stem.

2. In a resilient mounting, supporting and supported members, spring means between the members carrying the vertical load of the supported member, the supporting member including spaced horizontal walls and vertical wall portions, and the supported member having a vertical stem normal to the horizontal walls and spaced from the spring means, said horizontal walls having clearance openings therein through which the stem extends, the stem being movable normal and crosswise relative to the walls, a segmental ring damper between the walls slidably surrounding the stem, said damper being slidable between said walls in a direction crosswise of the stem, a contractile spring surrounding the segmental ring damper and urging it into contact with the stem to exert a friction damping force resisting lengthwise movement of the stem, and a washer between the walls having integral spring fingers urging the damper toward one of the walls to exert a friction damping force resisting crosswise movement of the stem.

3. In a resilient mounting, supporting and supported members, spring means between the members carrying the vertical load of the supported member, the supporting member having spaced horizontal walls and connecting vertical wall portions, the supported member having a vertical stem normal to the horizontal walls and spaced from the spring means, said horizontal walls having clearance openings therein through which the stem extends, the stem being movable normal and crosswise relative to the horizontal walls, a segmental ring damper between the horizontal walls and slidably surrounding the stem, said ring being movable between the walls in a direction crosswise of the stem, a contractile spring surrounding the segmental ring damper and urging it into contact with the stem to exert a friction damping force resisting lengthwise movement of the stem, and spring means engaging the damper and urging it toward one of the walls to exert a friction damping force resisting crosswise movement of the stem.

References Cited in the file of this patent

UNITED STATES PATENTS

| Number | Name | Date |
|---|---|---|
| 980,594 | Bulock | Jan. 3, 1911 |
| 1,245,243 | Lapham | Nov. 6, 1917 |
| 1,720,563 | Neal | July 9, 1929 |
| 1,734,596 | Rosenzweig | Nov. 5, 1929 |
| 1,776,911 | Jones | Sept. 30, 1930 |
| 1,816,077 | Farmer | July 28, 1931 |
| 2,322,193 | Kaemmerling | June 15, 1943 |
| 2,377,492 | Gorton | June 5, 1945 |
| 2,406,601 | Fyler | Aug. 27, 1946 |
| 2,425,565 | Robinson | Aug. 12, 1947 |
| 2,519,702 | Robinson | Aug. 22, 1950 |